(12) United States Patent
Blume et al.

(10) Patent No.: US 12,371,063 B2
(45) Date of Patent: Jul. 29, 2025

(54) INFERRING PICKUP OR DROP-OFF LOCATIONS USING CURATED DATA

(71) Applicant: WAYMO LLC, Mountain View, CA (US)

(72) Inventors: Cameron Blume, San Francisco, CA (US); Gaurav Agarwal, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 234 days.

(21) Appl. No.: 17/956,937

(22) Filed: Sep. 30, 2022

(65) Prior Publication Data
US 2024/0109562 A1 Apr. 4, 2024

(51) Int. Cl.
*B60W 60/00* (2020.01)
*G01C 21/34* (2006.01)

(52) U.S. Cl.
CPC ... *B60W 60/00253* (2020.02); *G01C 21/3438* (2013.01); *B60W 2552/05* (2020.02); *B60W 2554/20* (2020.02); *B60W 2556/40* (2020.02)

(58) Field of Classification Search
CPC ....... B60W 60/00253; B60W 2552/05; B60W 2554/20; B60W 2556/40; G01C 21/3438
See application file for complete search history.

(56) References Cited

U.S. PATENT DOCUMENTS

| | | | |
|---|---|---|---|
| 9,910,438 B1 * | 3/2018 | Arden | G01C 21/26 |
| 10,186,156 B2 | 1/2019 | Sweeney et al. | |
| 10,359,295 B2 | 7/2019 | Stroila et al. | |
| 10,723,555 B2 * | 7/2020 | Hance | G05D 1/021 |
| 2014/0277900 A1 | 9/2014 | Abhyanker | |
| 2016/0161266 A1 * | 6/2016 | Crawford | G01C 21/34 701/25 |
| 2016/0307041 A1 | 10/2016 | Biswas et al. | |
| 2016/0370194 A1 * | 12/2016 | Colijn | G08G 1/202 |
| 2017/0169535 A1 | 6/2017 | Tolkin et al. | |

(Continued)

FOREIGN PATENT DOCUMENTS

WO 2018188922 A1 10/2018

OTHER PUBLICATIONS

The Extended European Search Report for European Patent Application No. 23199888.1, Apr. 4, 2024, 9 Pages.

(Continued)

*Primary Examiner* — Daniel M. Robert
(74) *Attorney, Agent, or Firm* — Botos Churchill IP Law

(57) ABSTRACT

Aspects of the technology provide a method including receiving a request for a user to be picked up or dropped off by an autonomous vehicle, in which the request identifying a location, and determining a land parcel containing the identified location. The method also includes identifying a set of features that are within a selected distance from the identified location, filtering the set of identified features to obtain only curated features that are within the selected distance from the identified location, determining a distance between each curated feature and the identified location, and inferring an access point for the identified location based on the distances determined between each curated feature and the identified location. The inferred access point can then be provided to enable the autonomous vehicle to perform a pickup or drop-off.

19 Claims, 19 Drawing Sheets

(56) References Cited

U.S. PATENT DOCUMENTS

| | | | |
|---|---|---|---|
| 2020/0103242 A1 | 4/2020 | Chachra et al. | |
| 2020/0172089 A1* | 6/2020 | Dyer | G08G 1/168 |
| 2021/0285777 A1* | 9/2021 | Ostadzadeh | G01C 21/3617 |
| 2021/0348942 A1* | 11/2021 | Dubielzyk | G01C 21/3697 |
| 2022/0099450 A1 | 3/2022 | Pandit et al. | |
| 2022/0135085 A1* | 5/2022 | Wright | G06Q 10/02 701/25 |
| 2022/0163344 A1* | 5/2022 | Pandit | G01C 21/3438 |
| 2022/0205794 A1* | 6/2022 | Friedman | G08G 1/202 |
| 2022/0270490 A1* | 8/2022 | Sakurada | G08G 1/096883 |
| 2022/0309925 A1* | 9/2022 | Schwendimann | B60W 60/0025 |
| 2022/0383442 A1* | 12/2022 | Cho | G01C 21/3697 |
| 2023/0126561 A1* | 4/2023 | Gerrese | B60W 60/0013 701/23 |
| 2023/0294739 A1* | 9/2023 | Tsukamoto | B60W 60/00253 701/23 |
| 2024/0109562 A1* | 4/2024 | Blume | B60W 60/00253 |

OTHER PUBLICATIONS

Can, Yigit Baran, et al., "Structured Bird's-Eye-View Traffic Scene Understanding from Onboard Images", Open Access version, provided by Computer Vision Foundation, 2021, pp. 15661-15670.

He, Songtao, et al., "Sat2Graph: Road Graph Extraction through Graph-Tensor Encoding", arXiv:2007.09547v1 [cs.CV], Jul. 19, 2020, pp. 1-17.

Homeier, Kai, et al., "RoadGraph: High level sensor data fusion between objects and street network", 14th International IEEE Conference on Intelligent Transportation Systems (ITSC), 2011, pp. 1-6.

Klaudt, Sebastian, et al., "A-priori map information and path planning for automated valet-parking", Conference Paper, Jun. 2017, pp. 1-7.

Zipfl, Maximillian, et al., "Towards Traffic Scene Description: The Semantic Scene Graph", arXiv:2111.10196v1 [cs.LG] Nov. 19, 2021, pp. 1-6.

* cited by examiner

100

120

160

400

420

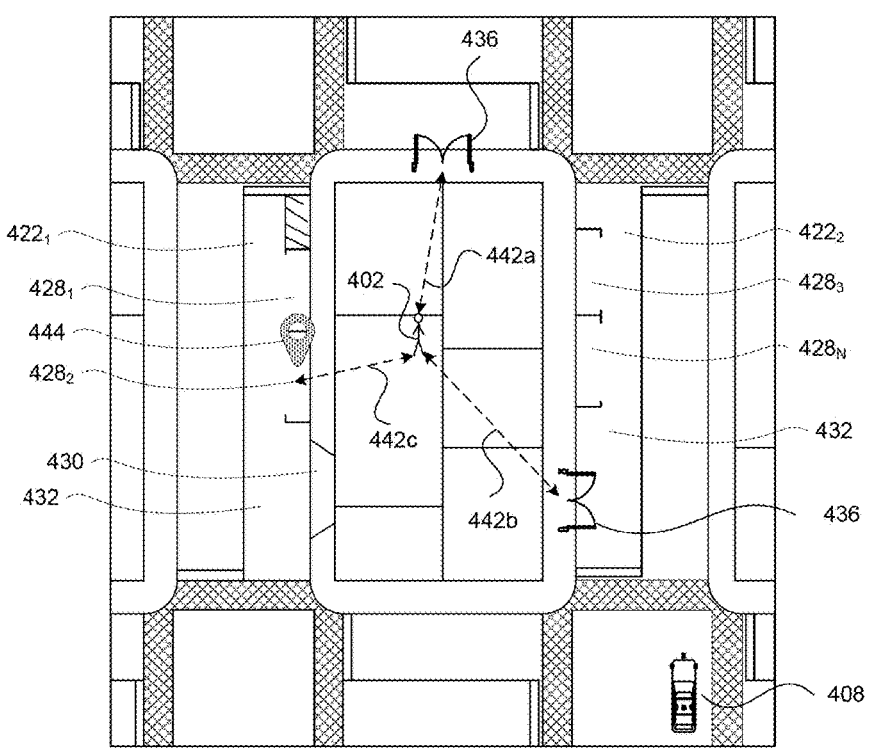

500

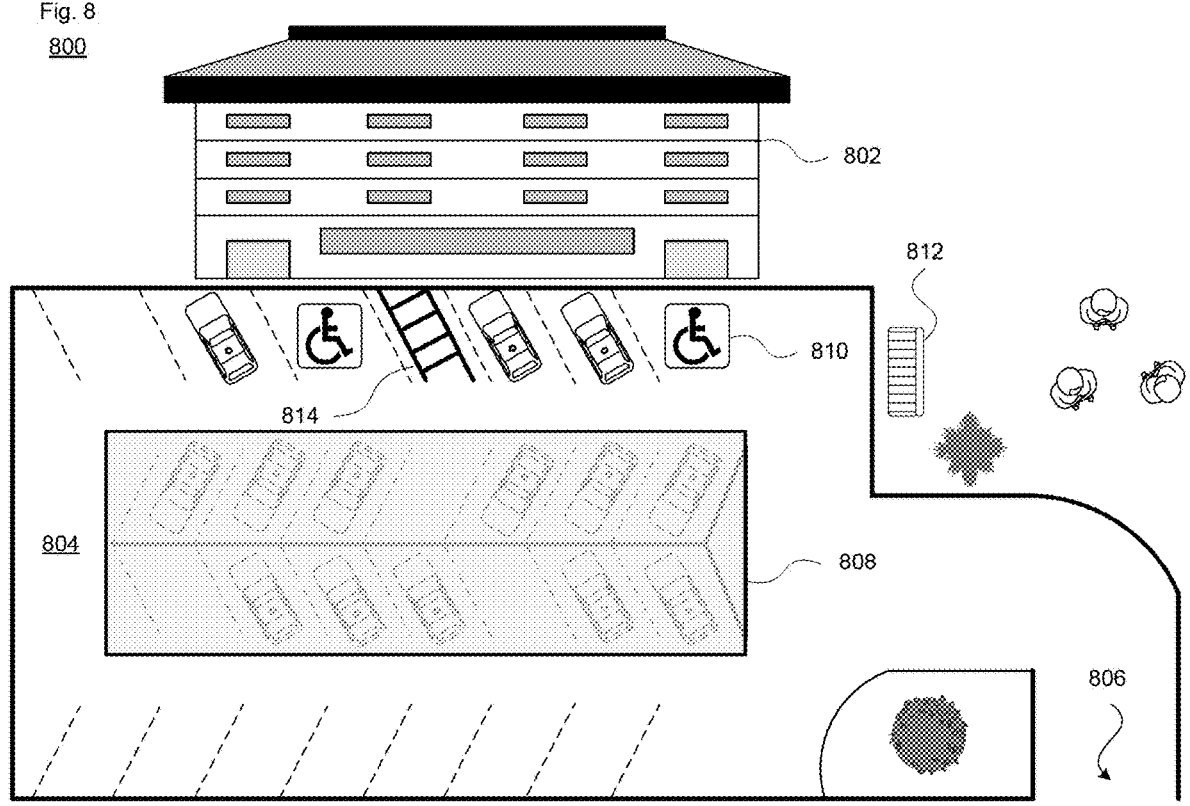

900

920

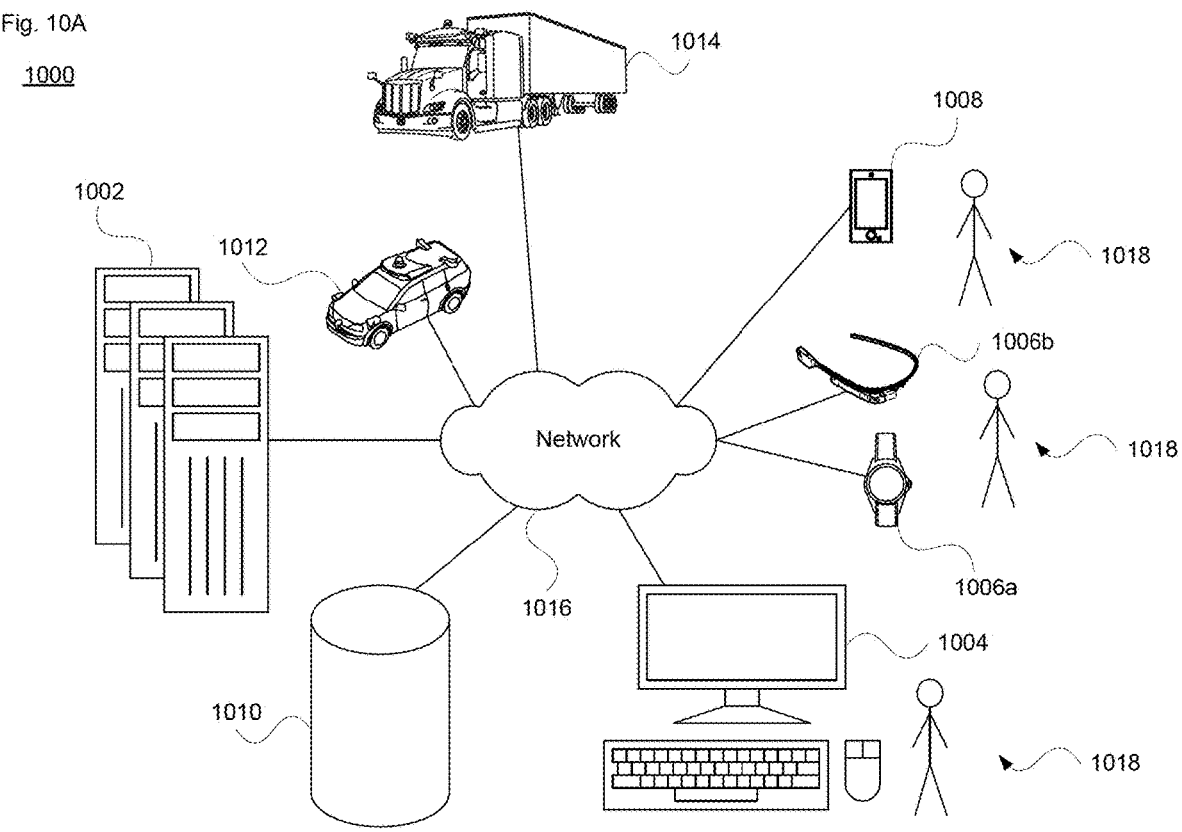

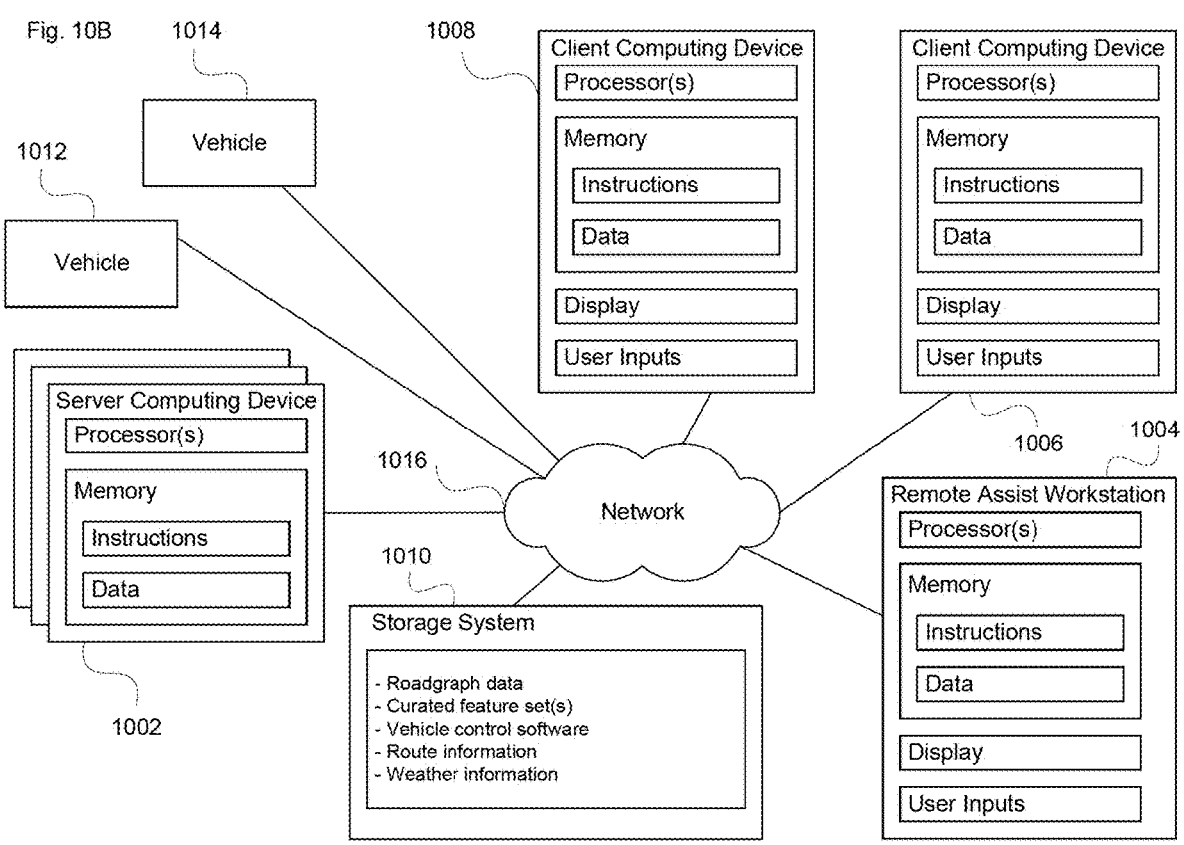

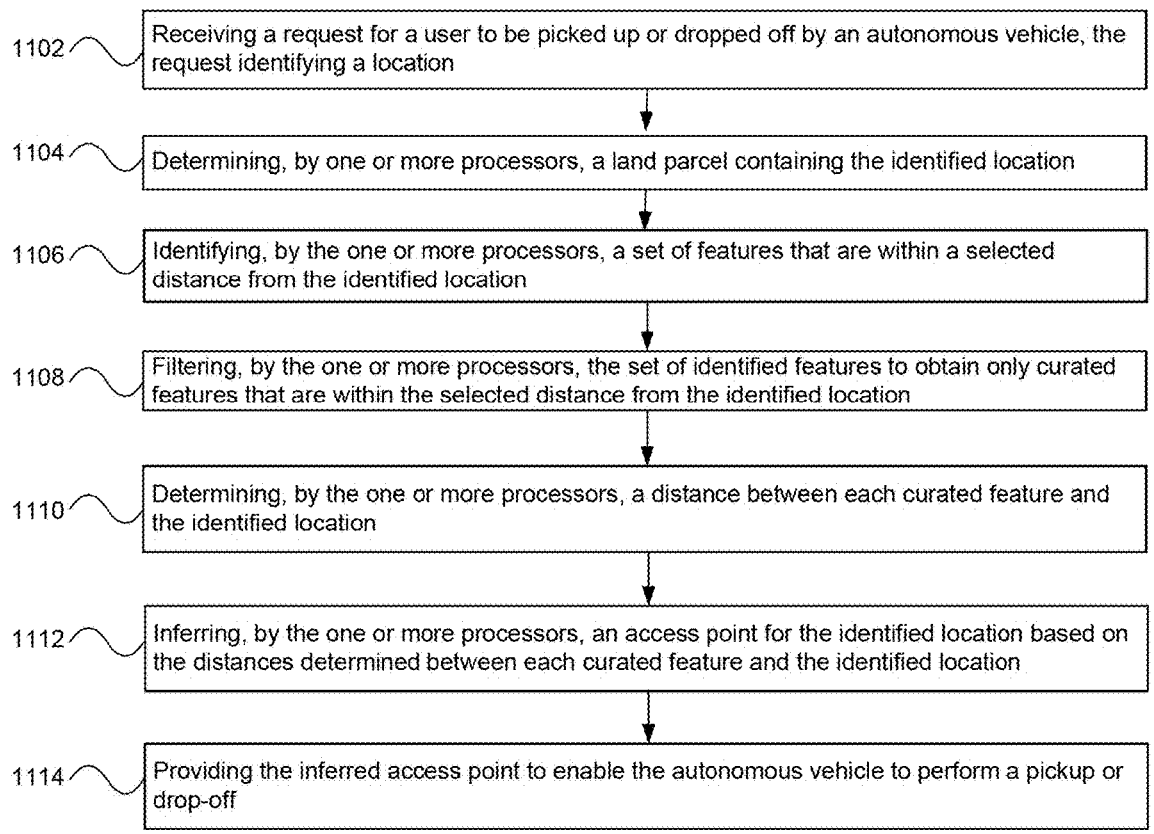

INFERRING PICKUP OR DROP-OFF LOCATIONS USING CURATED DATA

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. For a variety of reasons, it may be challenging to identify a suitable location. For instance, digital maps used for autonomous driving along a roadway may have a variety of details about the roadway and static objects along it. However, such maps may have few to no details about buildings or other locations that are set back from the roadway, which can lead to uncertainly about where the location for a pickup or drop-off should be scheduled. This can lead to location selection that is not only inefficient, but may make it hard for a user to get from the vehicle to their intended destination, or from their pickup spot to get to the vehicle.

BRIEF SUMMARY

Aspects of the technology utilize detailed electronic map information, such as roadgraph data, in conjunction with other features to select appropriate pickup and drop-off locations for riders and other users of an autonomous vehicle. For instance, if a person is located in a building with different access points or a campus that has multiple entrances and exits, the system may infer access point features based on selected roadgraph features. This can include filtering roadgraph features based on a curated set of such features. Using a person's current location, the system may search for all nearby filtered roadgraph features, and then find the distance to the person's location from each such feature. One of these features is then selected as the pickup or drop-off spot.

According to one aspect, a computer-implemented method comprises; receiving a request for a user to be picked up or dropped off by an autonomous vehicle, the request identifying a location; determining, by one or more processors, a land parcel containing the identified location; identifying, by the one or more processors, a set of features that are within a selected distance from the identified location; filtering, by the one or more processors, the set of identified features to obtain only curated features that are within the selected distance from the identified location; determining, by the one or more processors, a distance between each curated feature and the identified location; inferring, by the one or more processors, an access point for the identified location based on the distances determined between each curated feature and the identified location: and providing the inferred access point to enable the autonomous vehicle to perform a pickup or drop-off.

The method may further comprise selecting a particular spot in the land parcel to be used for a drop-off by the autonomous vehicle. Each ciliated feature may be associated with a corresponding roadgraph feature. Here, the ciliated features may be derived from a first map data source, and the corresponding roadgraph feature is derived from a second map data source distinct from the first map data source. By way of example, the curated features may include one or more of: a specific building in a multi-building complex, a residential driveway, a loading zone, a preferred pullover zone, an unmapped region driveway, a special designation parking space, a mailbox location, a seating spot, a covered parking area, or a designated walking path.

Inferring the access point may be further based on at least one of an estimated walking time or a walking cost. The selected distance may be a radius around the identified location. In one scenario, the request identifying the location is associated with roadgraph information from a first map data source, and determining the land parcel containing the identified location is based on parcel information from a second map data source different from the first map data source. When the identified location is an indoor location, the method may include identifying which indoor space of the land parcel a user is located at.

In an example, the method further comprises: when inferring the access point for the identified location based on the distances determined between each curated feature and the identified location results in the access point not satisfying a pickup criterion, identifying distances to a set of roadgraph features from an estimated user location, determining a nearest roadgraph feature of the set of roadgraph features, and selecting the nearest roadgraph feature for use as the inferred access point.

The identified location may be a roadgraph feature obtained from a set of roadgraph data. In this case, the roadgraph feature may be a driveway segment or a parking lot segment.

In one scenario, when the location is associated with a pickup of a rider by the autonomous vehicle, the filtering the set of identified features to obtain only curated features that are within the selected distance from the identified location may further include discarding identified features that do not support a selected wait time for the autonomous vehicle to park. In another scenario, when the location is associated with a delivery of a package by the autonomous vehicle, the filtering the set of identified features to obtain only curated features that are within the selected distance from the identified location may further include disturbing identified features that do not support a selected wait time for the autonomous vehicle to park.

According to another aspect, a computing system is provided that comprises memory configured to store sets of digital map information for locations of interest, and one or more processors operatively coupled to the memory. The one or more processors are configured to: receive a request for a user to be picked up or dropped off by an autonomous vehicle, the request identifying a location; determine a land parcel containing the identified location: identify a set of features that are within a selected distance from the identified location; filter the set of identified features to obtain only curated features that are within the selected distance from the identified location; determine a distance between each curated feature and the identified location; infer an access point for the identified location based on the distances determined between each curated feature and the identified location: and providing the inferred access point in order to enable the autonomous vehicle to perform a pickup or drop-off.

Each curated feature may be associated with a corresponding roadgraph feature. In this case, the curated features may be derived from a first map data source, and the corresponding roadgraph feature is derived from a second map data source distinct from the first map data source. In one scenario, the request identifying the location may be associated with roadgraph information from a first map data source, and determination of the land parcel containing the identified location is based on parcel information from a second map data source different from the first map data source.

In another scenario, when inferring the access point for the identified location based on the distances determined between each curated feature and the identified location results in the access point not satisfying a pickup criterion, the one or more processors may be configured to: identify distances to a set of roadgraph features from an estimated user location, determine a nearest roadgraph feature of the set of roadgraph features, and select the nearest roadgraph feature for use as the inferred access point. Furthermore, the identified location may be a roadgraph feature obtained from a set of roadgraph data.

BRIEF DESCRIPTION OF THE DRAWINGS

FIGS. 4A-4C illustrate an example indoor scenario in accordance with aspects of the technology.

FIG. 8 illustrates another example scenario n accordance with aspects of the technology.

FIGS. 10A-10B illustrate an example system in accordance with aspects of the technology.

FIG. 11 illustrates an example method in accordance with aspects of the technology.

DETAILED DESCRIPTION

In order to effectively perform pickups and drop-offs with an autonomous vehicle, the system may identify one or more access points associated with a particular location, such as an office building, shopping complex, campus, etc. However, there may not be a single dataset that includes detailed roadway information for autonomous driving plus geographic details about access points for locations of interest. For instance, electronic roadway maps may include various details about the roadway and objects along the roadway, such as traffic lights or signs, crosswalks, etc. Such roadway maps may have little to no information about what exists past the curb, and thus not include information about sidewalks or other walking paths, doors, points of interest or other features.

Conversely, general geographic maps may show such features, in one or more map layers, but may not have detailed information about the roadway other than the layout of road segments, which may not be precise enough to enable autonomous localization and driving, By way of example, entrance and/or exit access points to a building may be identified on a general geographic map. However, sometimes a user is inside a campus, but not inside a building, so there would be no specific access point to use when selecting a pickup or delivery location.

The deficiencies each type of dataset can make it challenging for an autonomous vehicle or a backend system supporting a fleet of autonomous vehicles to select pickup or drop-off locations. This can impact both ride operation as Nell as package or food deliveries. In order to address such issues, the systems and method described herein are able to infer locations of interest from roadgraph data and other features, which may be obtained from different, discrete datasets.

Example Vehicle Systems

Figure 1A:
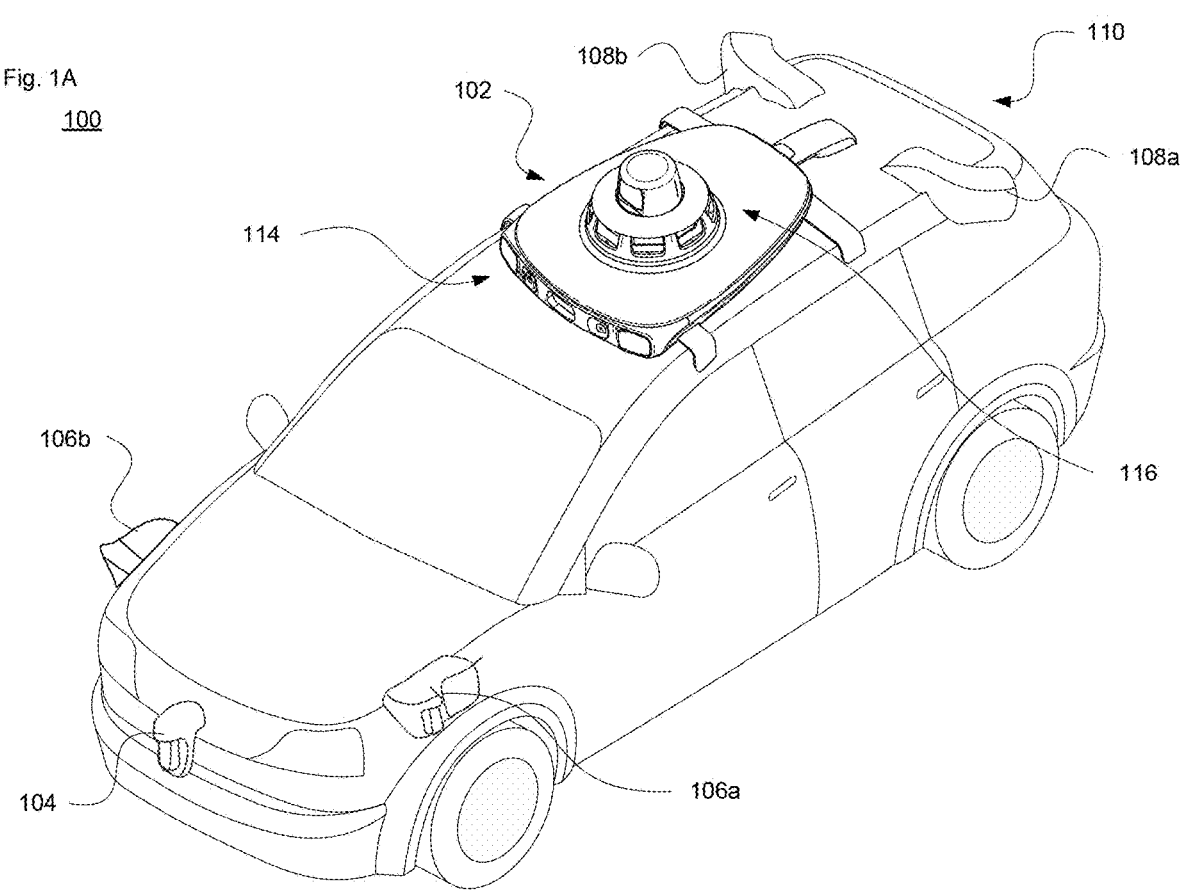
FIGS. 1A-1B illustrate example self-driving vehicles in accordance with aspects of the technology.
Figure 1B:
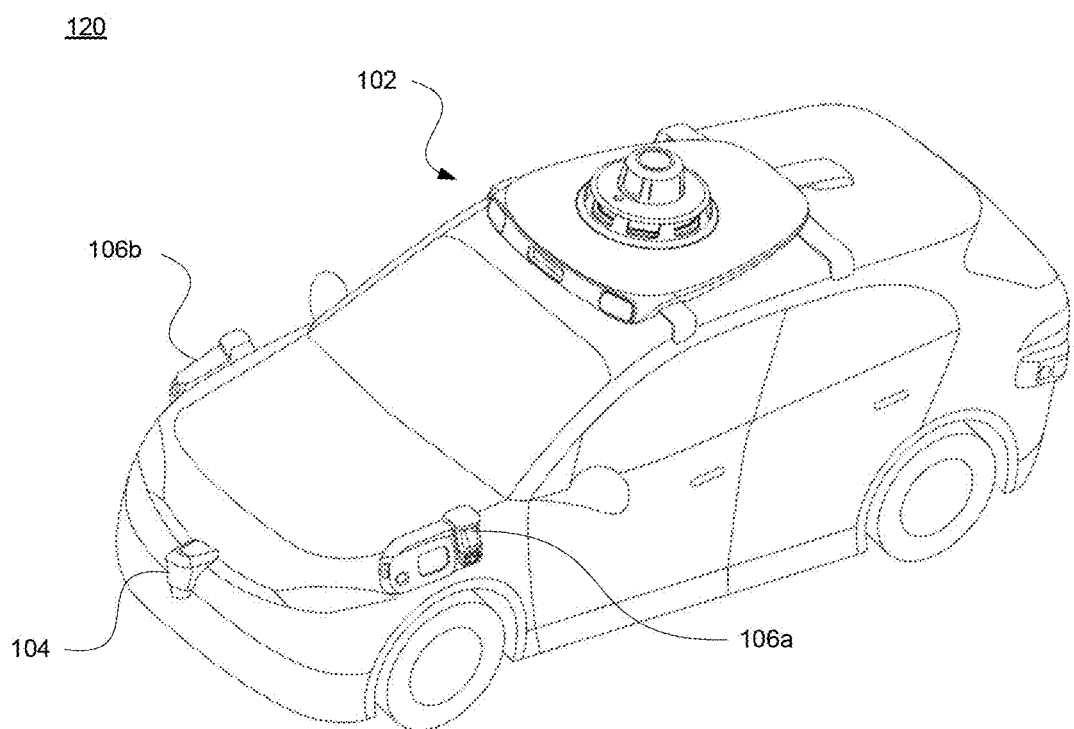
Figure 1C:
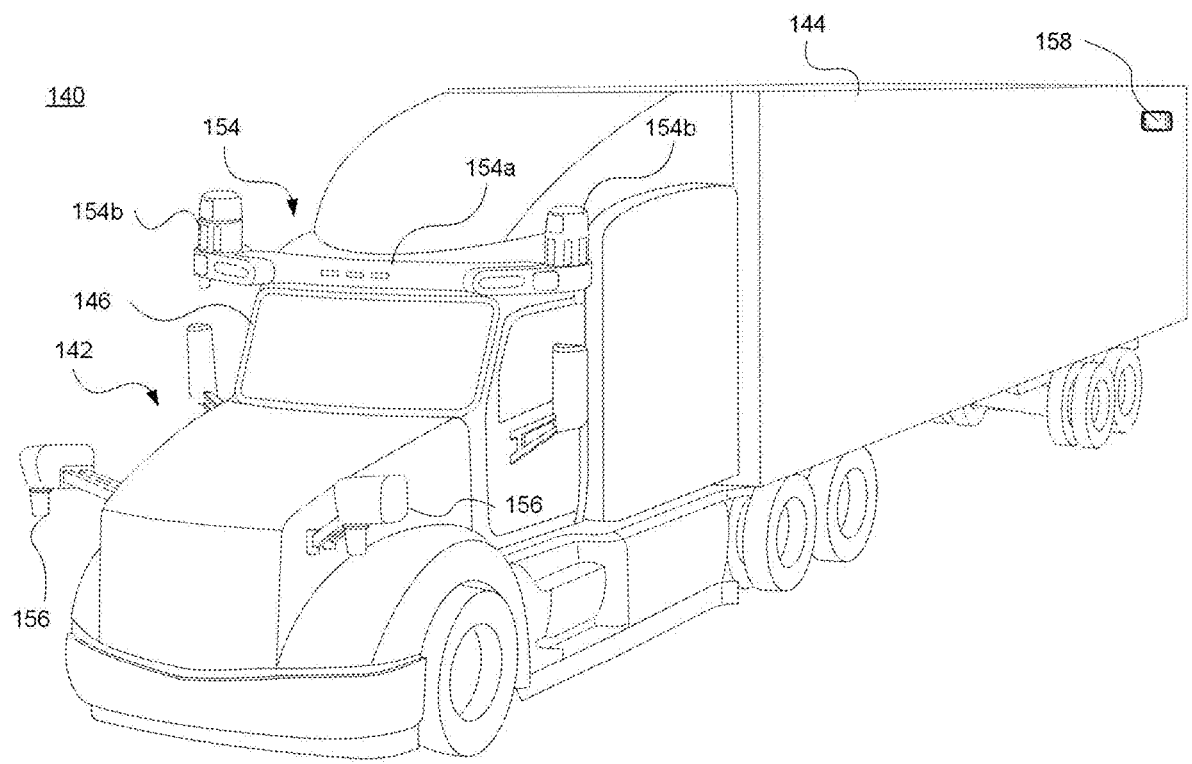
FIGS. 1C-1E illustrate example cargo and delivery type vehicles configured for use with aspects of the technology.
Figure 1D:
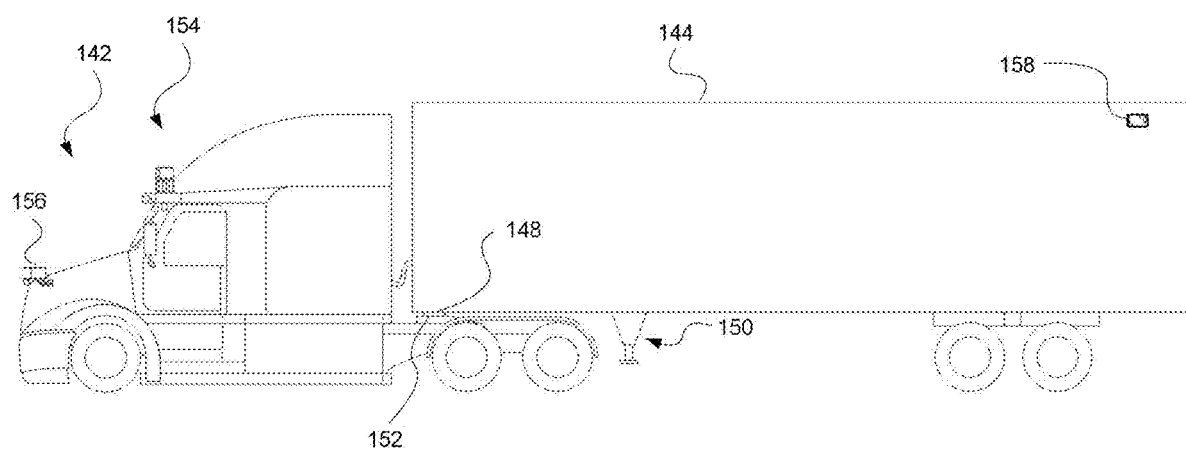
Figure 1E:
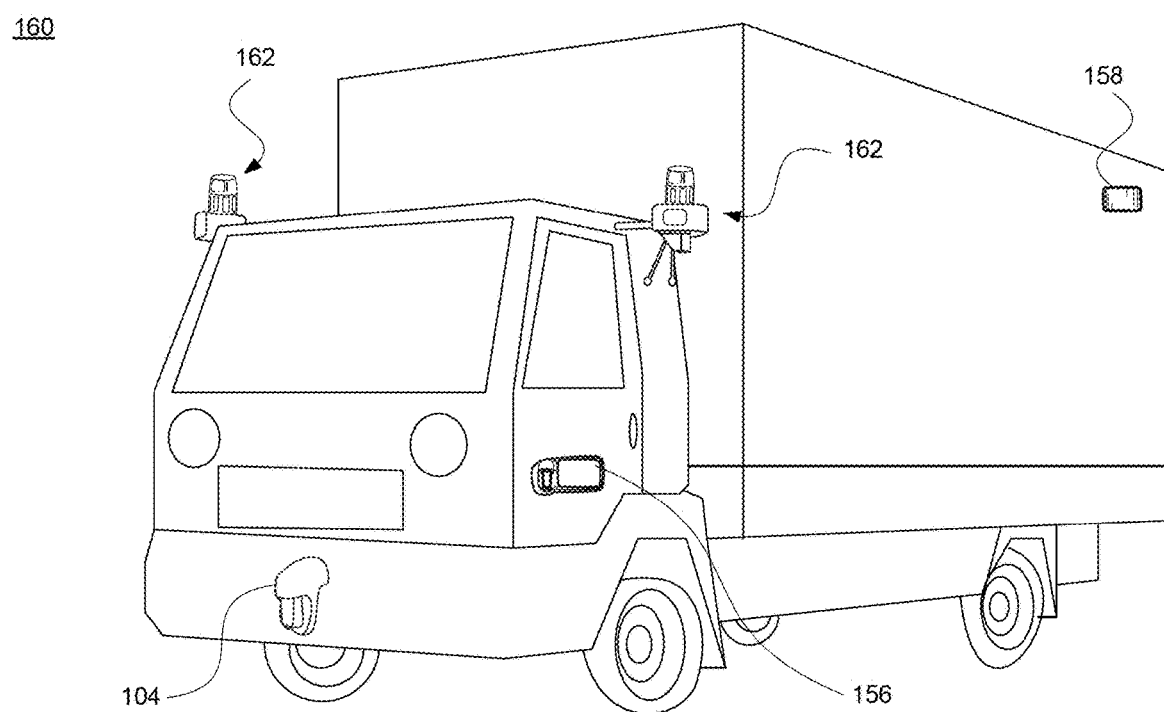

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently. For example, under current SAE classifications, there may be up to six levels (e.g., Level 0 through Level 5). In the lower SAE levels, the human driver is supported by various automated features such as emergency braking, blind spot or lane departure warning, lane centering and/or adaptive cruise control; however, the human driver must continuously oversee such features. In higher SAE levels, the human driver does not control certain (or all) driving features.

As described herein, in a semi or partially autonomous driving mode, even though the vehicle assists with one or more (hiving operations (e.g., steering, braking and/or accelerating to perform lane centering, adaptive cruise control, advanced driver assistance system (ADAS) or emergency braking), the human driver is expected to be situationally aware of the vehicle's surroundings and Supervise the assisted driving operations. Here, even though the vehicle may perform all driving tasks in certain situation, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of passenger or commercial vehicle including, but not limited to, cars (e.g., couples, sedans, minivans, vans, sport utility vehicles, shuttles, etc.), trucks (e.g., light duty such as classes 1-3, medium duty such as classes 4-6, and heavy duty trucks such as classes 7-8), motorcycles, buses, recreational vehicles, or special purpose vehicles (e.g., low speed vehicles, street cleaning, sweeping vehicles, garbage trucks, emergency vehicles, etc.).

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102: may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B, By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck, e.g., a class 7 or class 8 vehicle based on gross vehicular weight rating (GVWR). The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor May have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., shall range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab, Sensor units may also be located along other regions of the cab, such as along the front bumper or hood area, in the rear of the cab, adjacent to the fifth-wheel, underneath the chassis, etc. The trailer 144 may also have one or more sensor units 158 disposed therealong, for instance along one or both side panels, front, rear, roof and/or undercarriage of the trailer 144.

The perspective view 160 of FIG. 1E, illustrates an example panel truck or other vehicle that may be suitable for local deliveries (e.g., groceries, meals, mail or other packages, etc.), such as a light truck in classes 1-3 or a medium truck in classes 4-6 based on GVWR. Here, in contrast to the roof-lop housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the truck may include one or more sensors, such as lidar, radar, camera (e.g., optical or infrared), acoustical microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
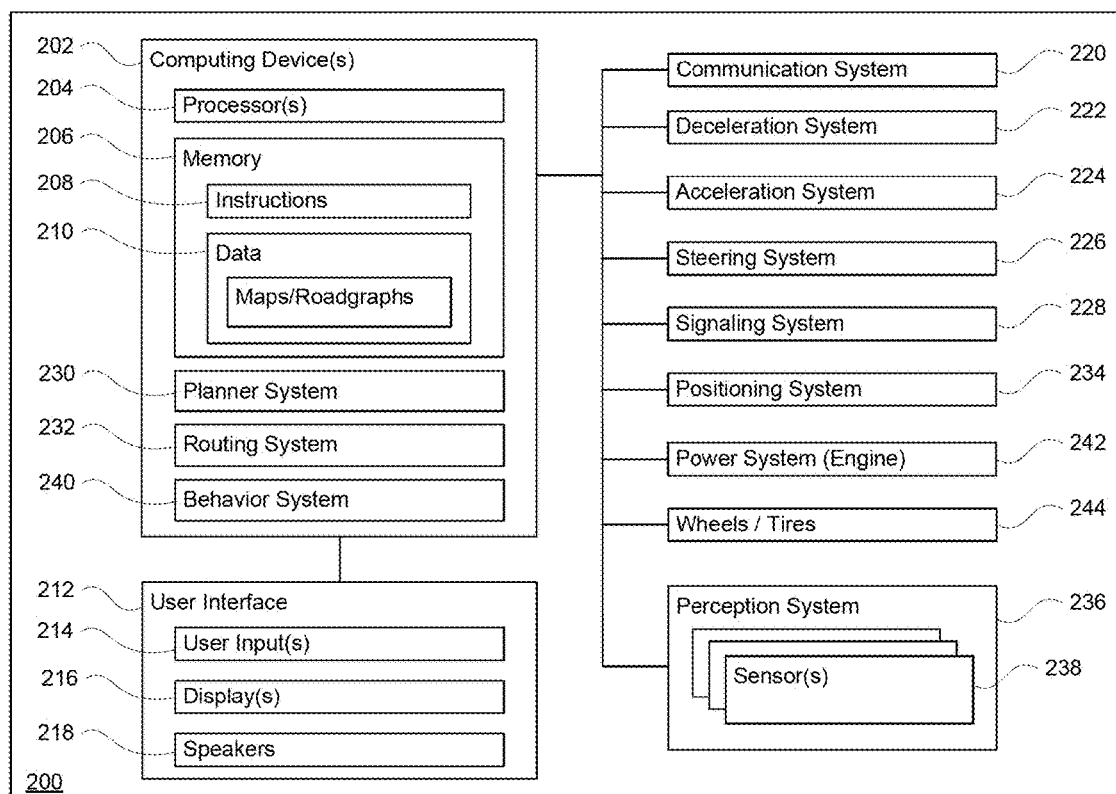
FIG. 2 illustrates components of a self-driving vehicle in accordance With aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents Or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and May be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information, Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

In addition to such roadgraph information, the system may store other curated map information associated with pickup or drop-off locations. This can include annotated roadgraph information, By way of example, the curated map information may identify the locations of handicap parking spaces or other specialty parking spaces (e.g., expectant mother parking, electric vehicle parking, limited time parking, permit parking, carpool parking, visitor parking, etc.). In an apartment complex or carpus with a lot of buildings, the citrated nap information may identify a leasing office, visitor building or other point of interest. Other types of ciliated map information may include locations for covered parking, residential driveways, passenger loading zones, preferred pullover zones, unmapped region driveways (e.g., vacant lots with driveways), or other locations where parking may be permissible for at least a short duration (e.g., on the order of 5-30 minutes).

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided. GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other Cars immediately around it, Which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By Way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in au acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other locations as shown in FIGS. 1A-B.

Such sensors of the perception system 236 may detect objects in the vehicle's external environment and their Characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc. as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the flame based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the Vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), Change direction (e.g., by turning the front or rear wheels of autonomous vehicle 100, 120 or 160 by steering system 226), and signal such changes (e.g., by lighting turn signals) using the signaling system 228, Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
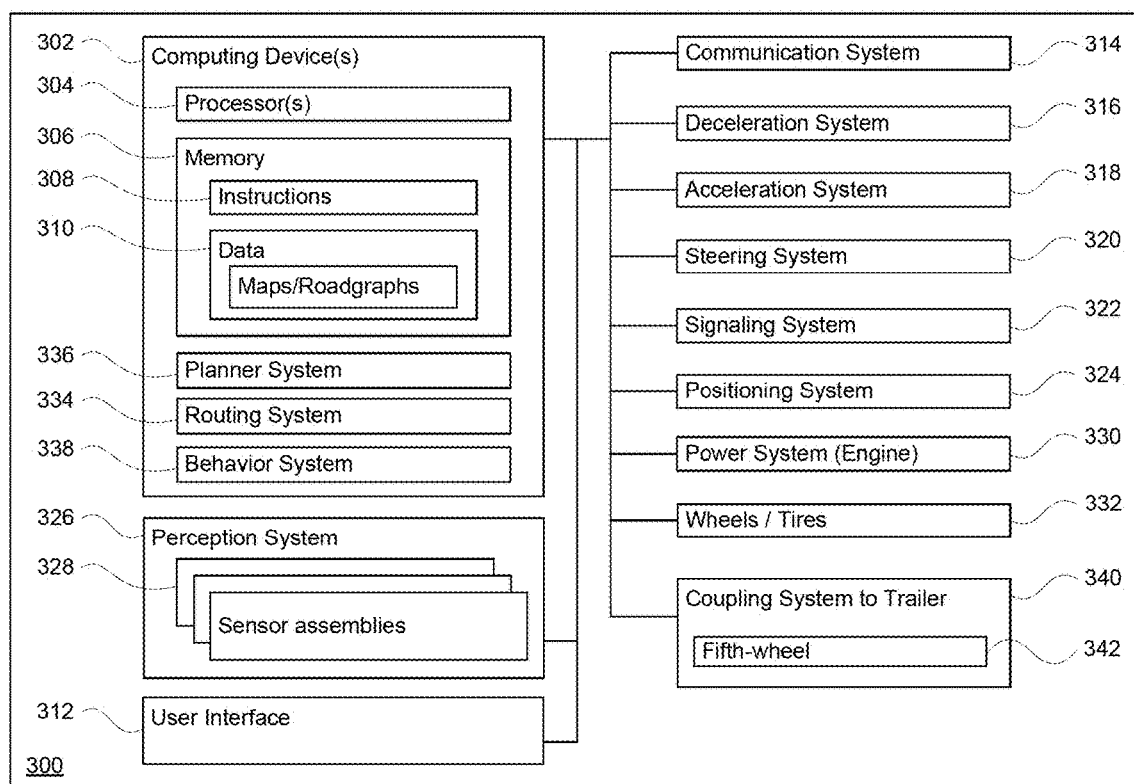
FIGS. 3A-3B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a heavy cargo truck, farm equipment or construction equipment, configured to operate in one or more autonomous modes of operation. As shown in the block diagram 300, the vehicle includes a control system of one Or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one Or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating With various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318 steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D, The computing devices 302 may communicate with the sensor assemblies located on both the tractor unit 142 and the trailer 144. Each assembly lay have one or more types of Sensors such as those described above.

Also shown in FIG. 3A is a coupling system 340 for connectivity between: the tractor unit and the trailer. The Coupling system 340 may include one or more power and/or pneumatic connections (not shown), and a fifth-wheel 342 at the tractor unit for mechanical connection to the kingpin at the trailer.

Figure 3B:
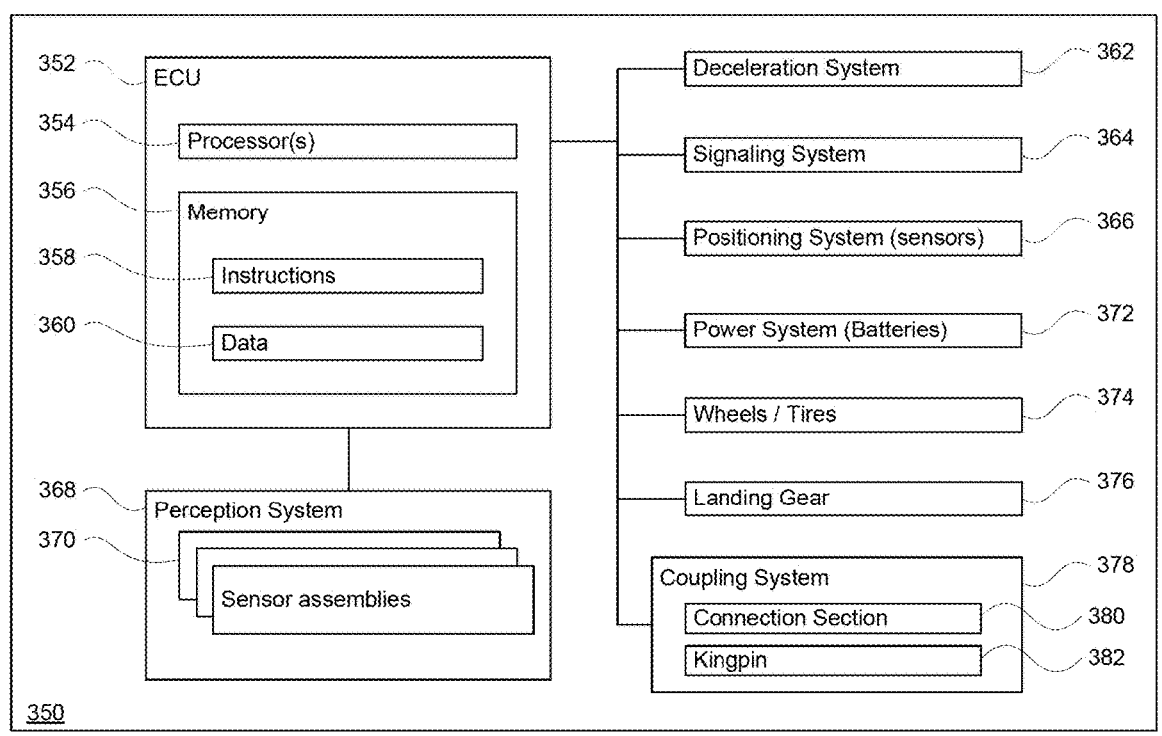

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations and Scenarios

There are various types of situations where it is beneficial to riders or other users of an autonomous vehicle service to identify an appropriate pickup or drop-off location. While in some situations merely knowing the street address can be Used to identify a particular location to use, in other situations the system may need to infer a suitable location. This can occur at an apartment complex, a school or business campus, park or other places where roadgraph data may not directly correlate to a door or other access point. The technology can be utilized to reduce the walking distance or time for a rider or other user to get to the vehicle, or when exiting the vehicle to reach their destination. This can be beneficial to the vehicle or to a backend fleet management system, as suitable locations can reduce the possibility that the vehicle needs to repeatedly adjust pull-over locations when making a stop, and can also help when determining where to pre-position the vehicle when scheduling one or more rides or deliveries.

Figure 4A:
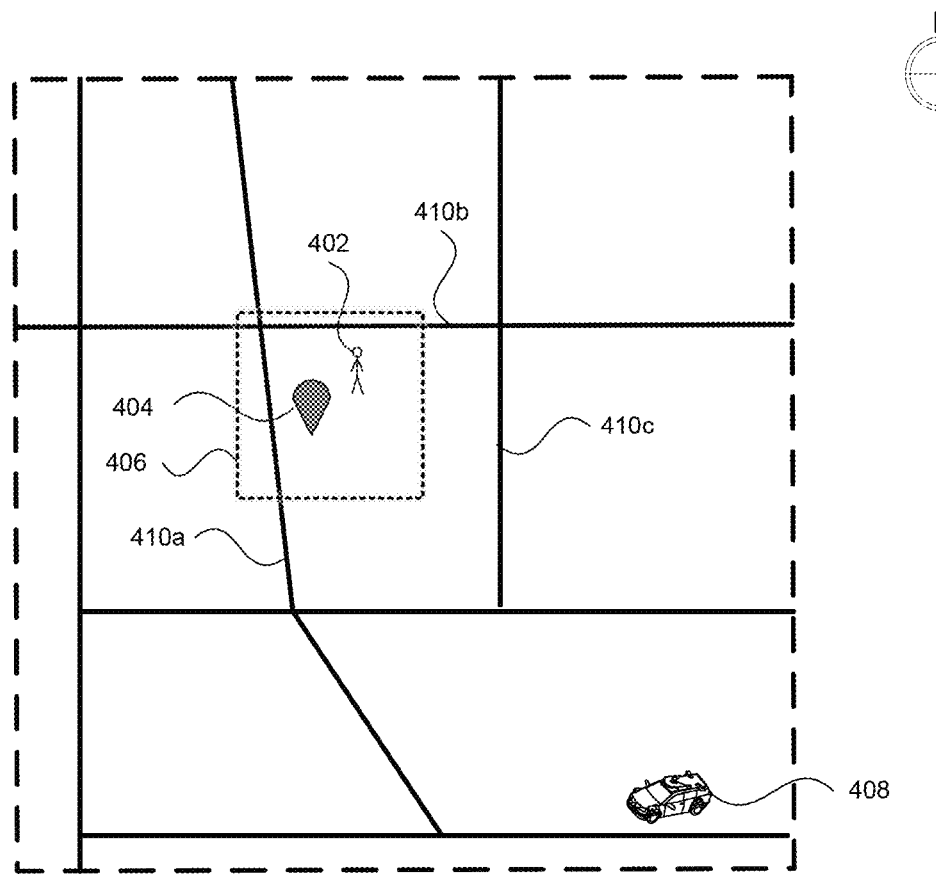

FIG. 4A illustrates a view 400 of a map for a pickup scenario where the user is indoors. This scenario showing the map with a user 402 associated with a location of interest (e.g., a mall, hotel or other building) indicated by pushpin 404. In this example, the system may identify a dashed boundary 406, which may represent the general size of the location of interest. In this example, vehicle 408 is assigned to pick up the user 402. However, given the size of the location of interest and possible uncertainty of exactly where the user 402 is located within it, there may be several different possible pickup locations. For instance, the vehicle 408 could select a pullover spot along road segment 410a, 410b or 410c. Selecting the "wrong" segment could mean requiring the user to walk farther or have the vehicle circle the block one or more times to find a different location to pick up the user.

Figure 4B:
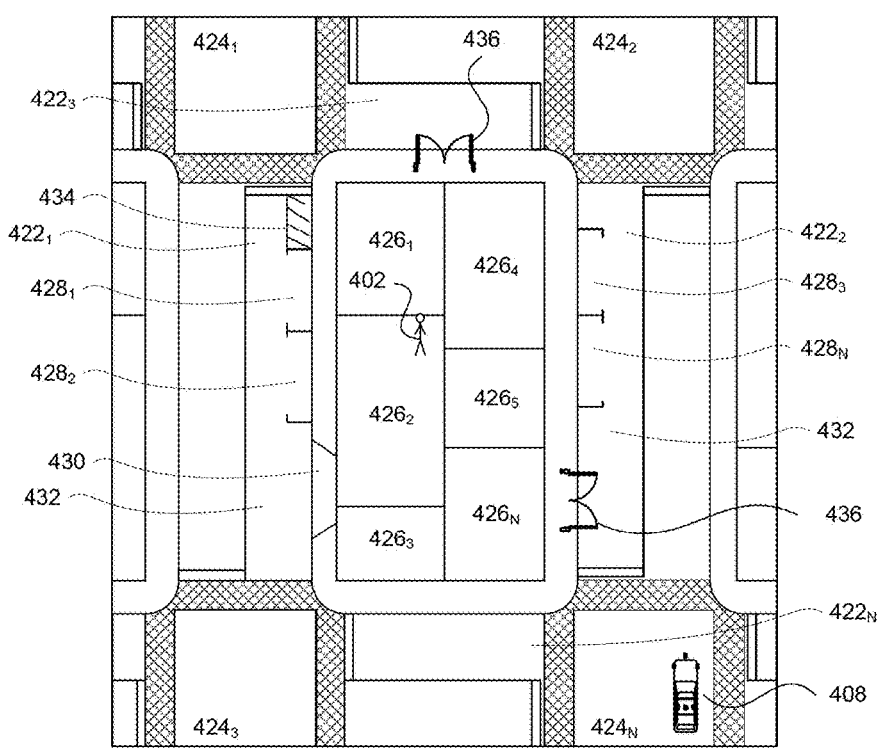

FIG. 4B illustrates a zoomed in example showing a map section 420 that includes the location of interest. Here, the map section 420 includes a plurality of different features that identify the shape and location of various features such as driving lanes 422 (e.g., $422_1 \ldots 422_N$), intersections 424 (e.g., $424_1 \ldots 424_N$), buildings or stores, stalls, kiosks, shops or other areas within a building 426 (e.g., $426_1 \ldots 426_N$), parking spaces 428 (e.g., $428_1 \ldots 428_N$), a driveway entrance (for example to a parking garage or other location) 430, shoulder areas 432, a no parking zone 434, and doors 436 at one or more locations around the building. Together, these features may correspond to a single city block, multiple blocks, or other area. The map section 420 may be a part of the detailed maps described above and used by the various computing devices in order to maneuver the vehicle 408 in an autonomous driving mode.

As shown view 420, user 402 may be in one of the stores 426 within the building at a given time (e.g., stole $426_2$). The system mars use GPS in combination with curated building information (e.g., entrances, ramps, pickup zones, etc.). The place data may be obtained—from the ride service's own mapping efforts or another map service (e.g., Google Maps™), The user's device may be queried for the location, and that device could use many possible technologies (GPS, WiFi, and/or Bluetooth, etc.) to estimate their indoor location. The location would then be sent via whatever wireless connection the user's device has available to it (e.g., cellular, WiFi, ad-hoc, etc.).

According to one aspect of the technology, the system may utilize two or more types of map data, which includes select one or more roadgraph features from a first map data source and/or other curated map features from a second map data source. The system can use a polygon or other geometric representation of each curated map feature and draw a line from the respective polygon to the user's estimated location. An example of this is shown in view 440 of FIG. 4G. Here, the curated features may include the doors 436 on the east and north sides of the building, and parking space 428₂ on the west side of the building. Dashed lines 442a, 4421 and 442c are shown between the user 402 and the respective features. In this example, it may be determined that the parking space 428₂ has the shortest line and thus be selected for the pickup location. Here, the system would assign location 444 as the access point associated with that parking space. However, if the user needs to go through either of the doors 436, it may be determined that the north door is the closest access point, and may be selected as the pickup location.

Figure 5:
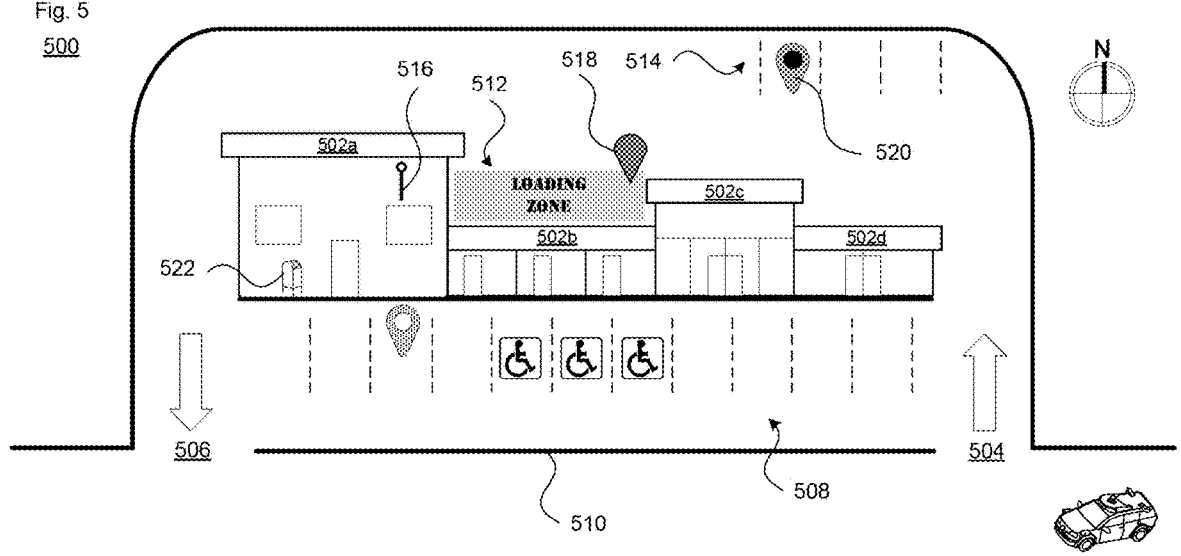
FIG. 5 illustrates an example scenario in accordance with aspects of the technology.

FIG. 5 illustrates another scenario 500, which evaluates various outdoor features to infer a suitable pickup or drop-off location. This scenario 500 includes a number of stores 502a-502d, which may be in a strip mall or cojoining parcels of land. As shown, there is an entrance 504, an exit 506, and a series of parking spaces 508 located between the front of the stores 502 and curb 510. Some of the parking spaces 508 may be specially designated, such as handicap spaces. In the rear of the stores is a loading zone 512 and an employee parking area 514. The roadgraph data may include information about the westbound and eastbound road segments, such as lane width, the type of broken line between the different sides of the road, and the placement of the entrance 504 and exit 506 along the curb 510. In one scenario the roadgraph data includes information about drivable segments within the strip mall or enjoining parcels. For instance, it can include information about the parking areas or loading zone.

In this example, the user may be located in store 502a, as shown by pin 516. Existing roadgraph and other data way not indicate that this store has a particular access point, although the OW of stores my have one or more access points associated therewith. Based on the roadgraph data and the user's estimated indoor location, the system may identify spot 518 at the loading, zone 512 or spot 520 in the employee parking area 514 as a pickup location. However, either of these spots may be undesirable for a number of reasons, e.g., truck traffic, convenient access from the customer exit, etc. Thus, according to one aspect, the system may employ curated map information from two or more different map data sources to infer a more appropriate pickup location. The curated map information in this example may include locations of the specialty parking spots and/or the location of mailbox 522, since both types of information suggest locations where users will have convenient access.

Figure 6:
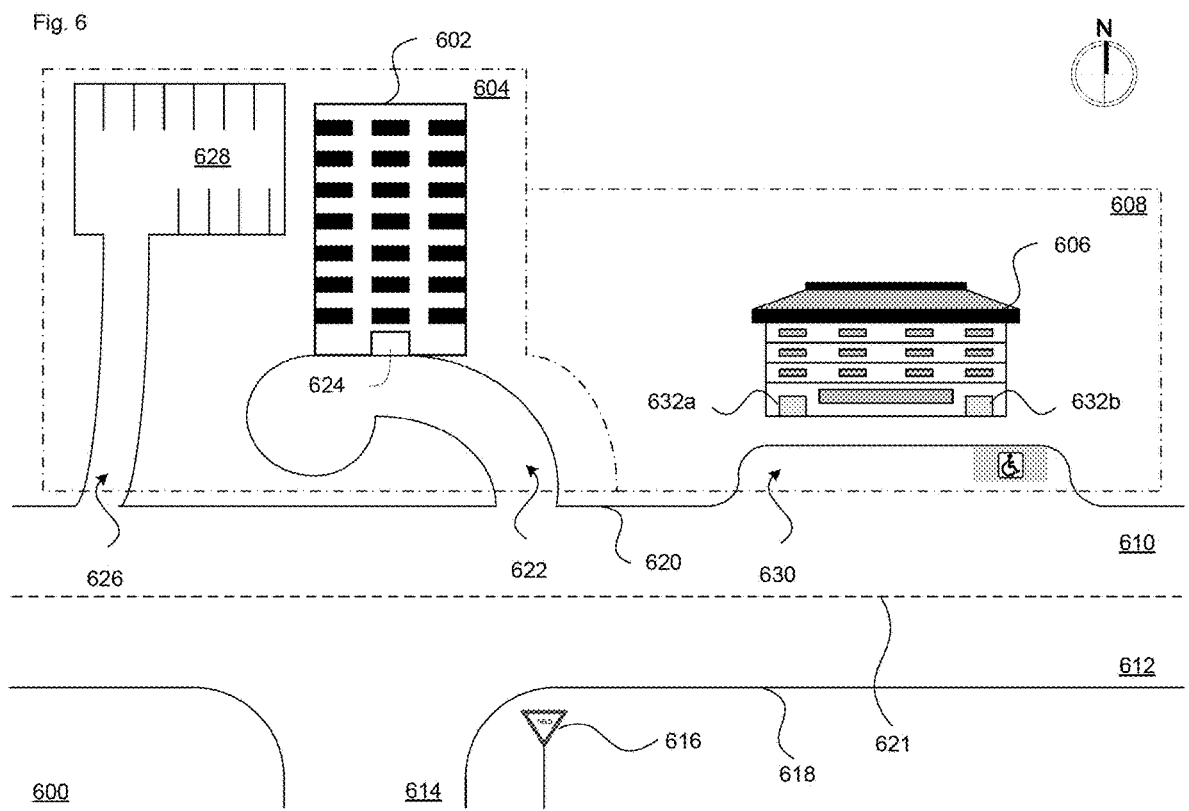
FIG. 6 illustrates another example scenario in accordance with aspects of the technology.

FIG. 6 illustrates another scenario 600 where different nearby buildings may be associated with different parcels of land. For instance, building 602 is on parcel 604, and building 606 is on parcel 608. In this scenario, there are one or more westbound lanes 610 and one or more eastbound lanes 612. Each set of lanes may have a speed limit associated therewith (not shown). A northbound road segment 614 has a yield sign 616. Curb 618 is located adjacent to the eastbound and northbound road segments, while curb 620 is adjacent to the westbound road segment. Center line 621 is disposed between the eastbound and westbound road segments. This information may be associated with a roadgraph.

In addition, the roadgraph may identify information about driveways for each parcel of land. For instance, parcel 602 may have a first driveway 622 that leads to a front entrance 624 of the building 602. This parcel may also have a second driveway 626 that leads to a parking area 628. And parcel 608 may have a driveway 630 leading to garages 632a and 632b. In addition to the position of the driveway entrance along the curb 620 the roadgraph may include information about each driveway. This can include the dimensions/shape of each driveway, such as width, length, and curvature of each driveway. For example, driveway information may include that driveway 622 has one end connected to the rightmost lane of westbound road segment 610, but is shaped as a cul-de-sac such that a vehicle can enter, make a turn, and exit from the same end of driveway 622 back to the street, Driveway information may include that driveway 626 has one end connected to the rightmost lane of westbound road segment 610 and another end connected to parking lot 628, such that a vehicle can enter, make a turn in the parking lot 628, and exit from the same end of driveway 626 back to the roadway. Driveway information may also include that driveway 630 is configured as a pull-out lane next to the westbound road segment 610, such that a Vehicle May simply change lanes in order to enter or exit driveway 630. The driveway information may further include lot boundaries associated with each driveway or each parcel.

Curated map information may identify that the parking area 628 is a covered parking area, or that one or more spaces in the pull-out lane of driveway 630 includes a handicap or other specific parking zone. As noted above, curated map information may also identify other features of interest. This can include a leasing office or visitor building in a multi-building complex. Alternatively or additionally, the curated map information may indicate the presence of residential driveways, passenger loading zones, preferred pullover zones, unmapped region driveways (e.g., vacant lots with driveways), Or other locations where parking may be permissible for at least a short duration (e.g., on the order of 5-30 minutes).

Inference Creation for Location Identification

In order to perform pickup or drop-offS, which may include package or food deliveries, the vehicle or a fleet management system may evaluate a number of different sources of information. User information may include selection of a location of interest (e.g., a street address or coordinates associated with pushpin or other indicia placed on an electronic map) and/or the user's current location (e.g., based on GPS, WiFi or other localization data). Map information used for driving purposes by the vehicle, such as roadgraph data, can be used to plot a trip by the vehicle to the location of interest. In addition to this, curated map information for features of interest can be used in combination with the roadgraph data. These features of interest may be associated with specific parcels of land. In one example, roadgraph data and ciliated features may come from different sources. In another example, both types of data may be integrated into a single data set. In one scenario, roadgraph data and parcel data (e.g., the land parcel itself and any buildings on the land) may be stored as polygon-based data.

In a pickup scenario, the system can take the user's current (estimated) location and find the land parcel that includes it. Then the system identifies all roadgraph features within the land parcel that are within a certain radius of the user's location. The set of identified features can then be filtered to obtain only those features that are part of a curated set of features, such as the different types of features discussed above. The curated set of features should be immediately adjacent to or within a short distance (e.g., within 3-5 meters) of a qualifying roadgraph feature, such as a driveway or parking lot segment. This ensures that the vehicle is able to get close enough to reliably pick up (or drop off) the user.

At this stage, the system determines the distance between the (estimated) user location and each citrated feature in the land parcel. The system may then infer the pickup location to be Where the closest curated feature is to the user's location, and identify this as an access point for route planning and pick up (or drop-off) purposes. This can include identifying that there is a roadgraph element adjacent to the closest curated feature, or within some walkable distance from it. This can ensure that the vehicle can pull over at the roadgraph element to enable pickup of the user. In one alternative, the system may factor in one or more of an estimated walking time, a walking cost, access point coverage and/or road-related parameters (e.g., ease of pulling into or out of the spot, permitted idle time, etc.) when inferring which location (associated with a corresponding curated feature) is most appropriate to select. If no suitable curated feature is found within the radius from the user's location, the radius may be increased by the system one or more times until a suitable access point is identified.

Figure 7:
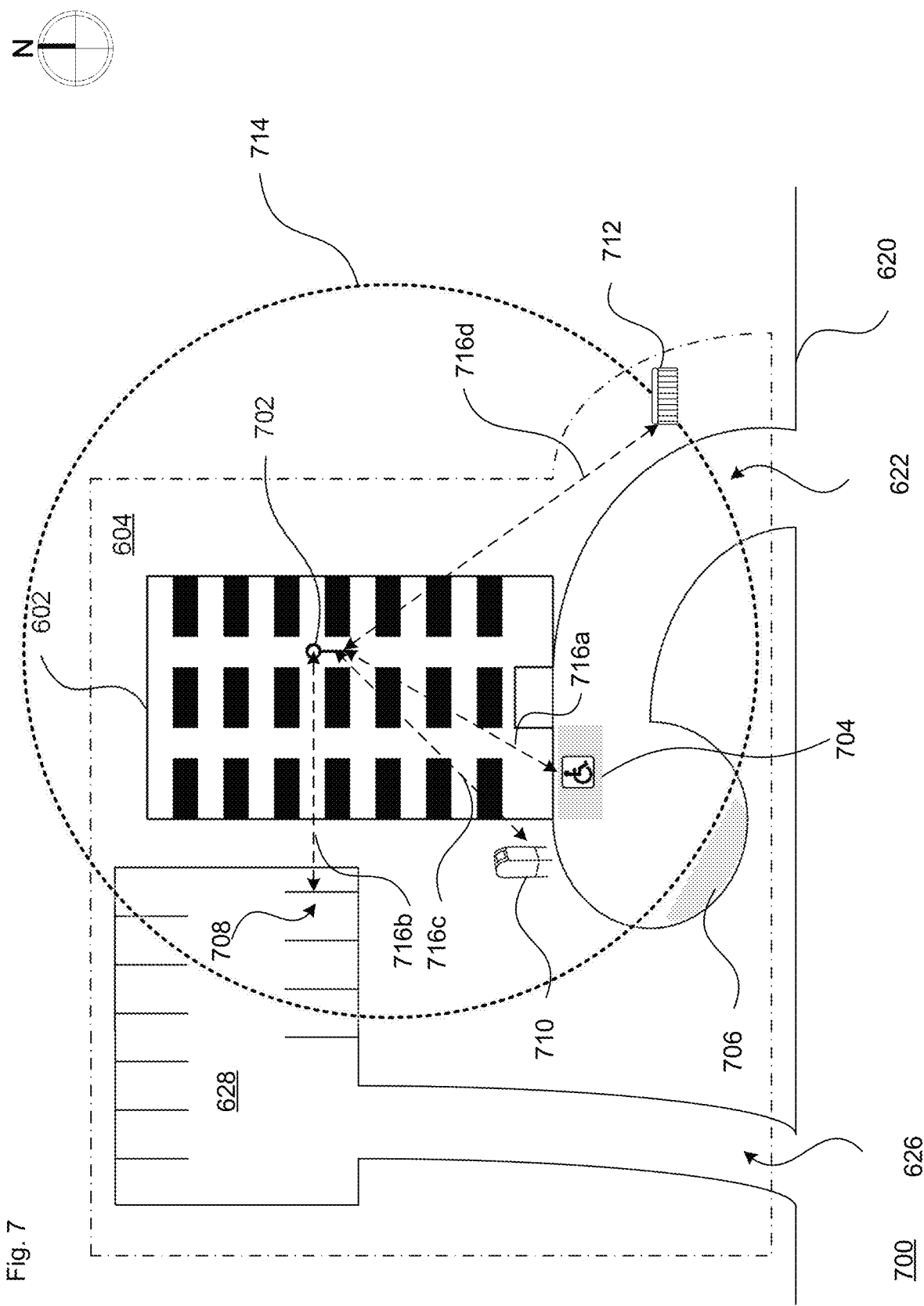
FIG. 7 illustrates an example inference approach in accordance with aspects of the technology.

FIG. 7 illustrates an example 700 based on parcel 604 of FIG. 6. Here, the user's estimated location is shown at point 702. There are a number of roadgraph features on the parcel, including entrance 622, exit 626 and parking area 628. Curated features include, by way of example only, a first specialty parking space 704 (e.g., a handicap parking space), a second specialty parking space 706 (e.g., a 10-minute parking space), and a third specialty parking space 708 (e.g., a covered parking space). Other curated features can include the location of a mailbox 710 and a bench 712, which may be a bus stop be located near the curb 620. In this example, dashed circle 714 indicates the radius for evaluation. By way of example, the radius may be on the order of 20-40 meters from the user's estimated location. In this example, the radius would exclude the parking space 706, but would include the bench 712 since at least a part of it is located within the radius. Distances 716a, 716b, 716c and 716d are determined between the user's location and the curated features 704, 708, 710 and 712, respectively. Here, a location adjacent to the mailbox 710 may be chosen because it is the closest feature to the user's location. Alternatively, the covered parking spot 708 may be chosen because it has approximately the same distance as the mailbox, but provides the opportunity for the vehicle to park and wait for the user without dealing with a busy active cul-de-sac that is part of driveway 622. For indoor situations the approach may first involve determining which building or other indoor space the user is in, and then locating an access point (e.g., the front door, a side door, garage exit, etc.). If this does not result in a suitable pickup point (e.g., due to walking distance, walking time or other pickup criterion), then the system would draw lines to roadgraph features such as parking spots from the user's location, and then find the nearest one and use that as the pickup location. This type of fallback approach enables the system to derive an appropriate pickup (or drop-off) selection even in buildings where there is a lack of better data from a non-roadgraph dataset.

FIG. 8 illustrates an example scenario 800 for a drop-off situation. Here, a rider may identify a drop-off location such as by inputting a street address or landmark name into a ride app on their device. In this example the user input identifies location 802, which is associated with a particular parcel of land. The parcel includes a parking lot 804 with a driveway entrance/exit 806 that leads to a street (not shown). In this example, the roadgraph may include details about the driveway entrance/exit 806 and the adjoining road segment, as well as the shape of the parking lot 804. Curated features may include covered parking area 808, specialty parking spaces 810 (e.g., for handicap parking), and a bench or other waiting area 812. Another curated feature is a designated walkway or other path 814 that leads from the location 802 into the parking lot 804.

In this example, the system may select a particular spot in the parcel to initiate the inference evaluation. By way of example, this spot may be the geographic center of the parcel, a front entrance of a building on the parcel, a location in the parcel closest to a given road segment, or other location. Once the location for the parcel has been selected, the system identifies all roadgraph features within the land parcel that are within a certain radius of that location. The set of identified features can then be filtered to obtain only those features that are part of a curated set of features, such as the different types of features discussed above. As with the approach above for pickups, at this stage the system then determines the distance between the selected location and each curated feature in the land parcel. The system may then infer the pickup location to be where the closest curated feature is to a selected location, and identify this as an access point for route planning and pick up (or drop-off) purposes. This can include identifying that there is a roadgraph element adjacent to the closest curated feature, or within some walkable distance from it. This can ensure that the vehicle can pull over at the roadgraph element to enable pickup of the user. Thus, in this scenario, the system may select a spot in the covered parking area 808. While this spot may not be closest to the selected location (e.g., an entrance to the building 802), it is near designated walkway 814 and is a place easily accessible by the vehicle from the driveway entrance/exit 806.

Drop-off determinations may be done in the same manner us pickups. One difference that may affect the selection of the place for the vehicle to slope is that for giving people, rides the drop-off location may not need to be able to accommodate a stopped vehicle for as long as a pickup location, since the rider is already in the vehicle and may be able to exit quickly. In contrast, at pickup the vehicle may need to wait several minutes for the rider to arrive. In contrasts for deliveries, such timing may be reversed. With a delivery, dropoff is the stage where the vehicle may need to wait several minutes for the person to arrive and retrieve their food, packages, etc., whereas a pickup for a delivery may usually be at a business location such as a grocery store, shop, distribution point, or restaurant, with professional staff Who should be able to load the vehicle promptly.

Figure 9A:
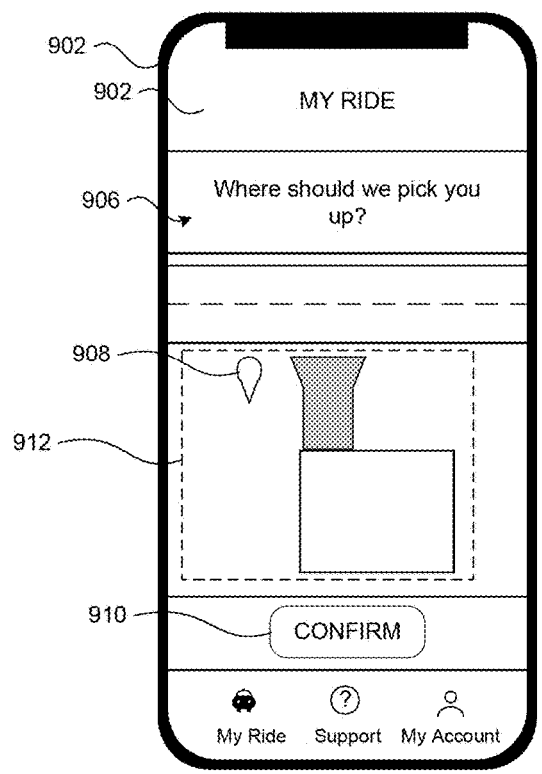
FIGS. 9A-9B illustrate a pickup or drop-off adjustment in accordance with aspects of the technology

A pickup or drop-off location may be arranged when a user schedules a pickup or drop-off by an autonomous vehicle. This can be done using an app on the user's mobile phone or other client device tablet PC, smartwatch, etc.). As shown in view 900 of FIG. 9A, client device 902 has an app with a user interface 904, which can be used to schedule the trip with an autonomous vehicle ride hailing service. The person scheduling the trip may select a pickup spot. For instance, one part of the user interface 906 may ask where the rider would like to be picked up. The user may manipulate the user interface to select a spot, such as shown by icon 908 in a map display area of the user interface, and the user may confirm the spot via a button 910 or other selection option.

Figure 9B:
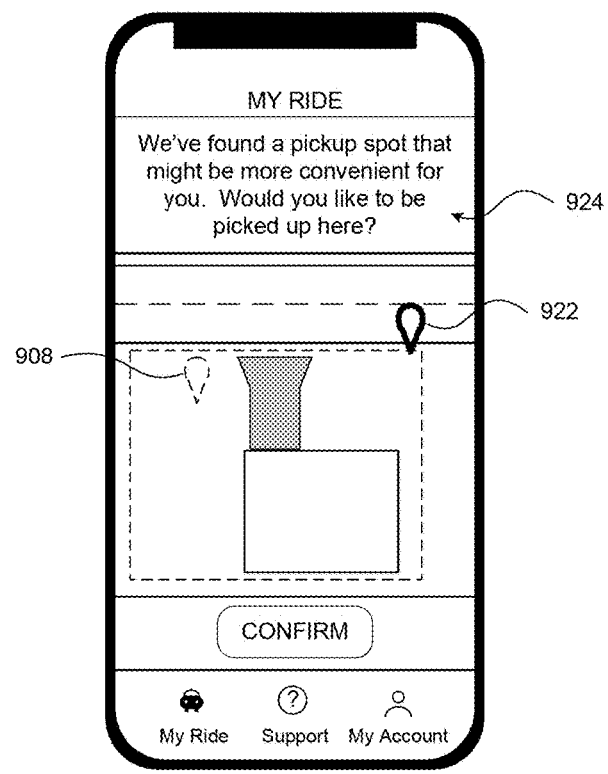

Upon selection of the location by the user, the system may identify a parcel of land associated with that location, as shown by dashed box 912. Prior to the actual pick up time, the vehicle or the back-end system may suggest a different pickup or drop-off location based on the inference approach discussed above. For instance, as shown in view 920 of FIG. 9B, a suggested update may be sent by the vehicle or the backend system for presentation on the client device user interface. Here, a different pickup spot 922 is shown, with the original spot 908 in dashed lines, Message 924 indicates the suggestion for the alternative location. Once the suggested pickup location is accepted (or rejected), turn-by-turn or other walking directions may be presented in a map view of the user interface, where the current or estimated location of the rider is shown in relation to the vehicle at the pickup location. The rider may request navigation assistance from a rider support agent via the app UI (not shown). Another aspect is the ability of the UI to offer tradeoffs between pickup spots for different reasons. For example, one spot may be a shorter walk, while another spot might produce a faster trip or a faster pickup, while a third spot might be a street with low traffic or typically empty curbs or shoulders where the vehicle could pullover and wait for a long time.

Example System Architecture

One example of a back-end system that can infer pickup or drop-off locations for users of a fleet of vehicles is shown in FIGS. 10A and 10B. In particular, FIGS. 10A and 10B are pictorial and functional diagrams, respectively, of an example system 1000 that includes; plurality of computing devices 1002, 1004, 1006, 1008 and a storage system 1010 connected via a network 1016. System 1000 also includes vehicles 1012 and 1014 configured to operate in an autonomous driving mode, which may be configured the same as or similarly to vehicles 100, 120, 140 and/or 160 of FIGS. 1A-E. Vehicles 1012 and/or vehicles 1014 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles. As shown in FIG. 10B, each of computing devices 1002, 1004, 1006 and 1008 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1016. The network 1016 and any intervening nodes may include various configurations and protocols including short range communication protocols such as Bluetooth™, Bluetooth LE™, the Internet. World Wide Web, intranets, virtual private networks, wide area networks, local networks, private networks using communication protocols proprietary to one or more companies, Ethernet. WiFi and HTTP, and various combinations of the foregoing. Such communication may be facilitated by any device capable of transmitting data to and from other computing devices, such as modems and wireless interfaces.

In one example, computing device 1002 may include one or more server computing devices having a plurality of computing devices, e.g., a load balanced server farm, that exchange information with different nodes of a network for the purpose of receiving, processing and transmitting the data to and from other computing devices. For instance, computing device 1002 may include one or more server computing devices that are capable of communicating with the computing devices of vehicles 1012 and/or 1014, as well as computing devices 1004, 1006 and 1008 via the network 1016. For example, vehicles 1012 and/or 1014 may be a part of a fleet of autonomous Vehicles that can lie dispatched by a server computing device to various locations. In this regard, the computing device 1002 may function as a dispatching server computing system which can be used to dispatch vehicles to different locations in order to pick up and drop off passengers or to pick up and deliver cargo or other items. In addition, server computing device 1002 may use network 1016 to transmit and present information to a user of one of the other computing devices or a rider in a vehicle. In this regard, computing devices 1004, 1006 and 1008 may be considered user computing devices.

As shown in FIGS. 10A-B each client computing device 1004, 1006 and 1008 may be a personal computing device intended for use by a respective user 1018, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch or head mounted display that is operable to display information), and user input devices (e.g., a mouse, keyboard, touchscreen, microphone or gesture sensor such as a close range RF gesture detection device). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1006 and 1008 may be mobile phones or devices such as a wireless-enabled PDA, a tablet PC, a wearable computing device (e.g., a smartwatch or head mounted display), or a netbook that is capable of obtaining information via the Internet or other networks.

In some examples, client computing device 1004 may be a remote assistance workstation used by an administrator or operator to communicate with riders of dispatched vehicles, customers awaiting deliveries or store employees providing items for delivery. Although only a single remote assistance workstation 1004 is shown in FIGS. 10A-B, any number of such workstations may be included in a given system. Moreover, although the workstation is depicted as a desktop-type computer, such workstations may include various types of personal computing devices such as laptops, netbooks, tablet computers, etc. By way of example, the remote assistance workstation may be used by a technician or other user to help adjust pickup or drop-off locations, assist riders with opening or Closing the vehicle's doors, etc.

Storage system 1010 can be of any type of computerized storage capable of storing information accessible by the server computing devices 1002, such as a hard-drive, memory card, ROM, RAM, DVD, CD-ROM, flash drive and/or tape drive. In addition, storage system 1010 may include a distributed storage system where data is stored on a plurality of different storage devices which may be physically located at the same or different geographic locations. Storage system 1010 may be connected to the computing devices via the network 1016 as shown in FIGS. 10A-B, and/or may be directly connected to or incorporated into any of the computing devices.

Storage system 1010 may store various types of information. For instance, the storage system 1010 may store autonomous vehicle control software which is to be used by vehicles, such as vehicles 1012 or 1014, to operate such vehicles in an autonomous driving mode. Storage system 1010 may also store roadgraph information and one or more sets of curated features associated with pickup or drop-off locations. The storage system 1010 can also include route information, weather information, etc. This information may be shared with the vehicles 1012 and 1014, for instance to help with operating the vehicles in an autonomous driving mode. Such information can also be shared with customers via the UI or other app on their client device(s).

FIG. 11 illustrates a flow diagram 1100 according to one aspect of the technology, which provides a method that includes, at block 1102, receiving a request for a user to be picked up or dropped off by an autonomous vehicle, the request identifying a location. Then, at block 1104, the method includes determining, by one or more processors (e.g., of a back-end fleet management system or of a particular vehicle), a land parcel containing the identified location. At block 1106, the method includes identifying, by the one or more processors, a set of features that are within a selected distance from the identified location. At block 1108 the method includes filtering, by the one or more processors, the set of identified features to obtain only curated features that are within the selected distance from the identified location. At block 1110 the method includes determining, by the one or more processors, a distance between each curated feature and the identified location. Then at block 1112 the method includes inferring, by the one or more processors, an access point for the identified location based on the distances determined between each curated feature and the identified location. And at block 1114 the method includes providing the inferred access point to enable the autonomous vehicle to perform a pickup or drop-off.

While certain use cases described above focus on rider pickup Situations in the tide hailing context, the technology may be used in many other situations. This can include delivery situations, Where person going to the vehicle may be a restaurant or store employee loading the vehicle with a meal, groceries, prescription or other package. Similarly, in a trucking scenario, the person or people heading to the vehicle could be warehouse workers that will load or unload the truck with cargo, or that need to transfer cargo to or from the truck a mail delivery truck). All of these situations can benefit from the inferred location approaches described above.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method comprising:
receiving a request for a user to be picked up or dropped off by an autonomous vehicle, the request identifying a location;
determining, by one or more processors, a land parcel containing the identified location based on parcel information that is derived from a first map data source;
identifying, by the one or more processors, a set of features within the determined land parcel that are within a selected distance from the identified location;
filtering, by the one or more processors, the set of identified features to obtain curated features that are: (1) within the selected distance from the identified location, and (2) within the determined land parcel;
determining, by the one or more processors, a distance between each curated feature and the identified location;
inferring, by the one or more processors, an access point for the identified location based on the distances determined between each curated feature and the identified location;
determining, by the one or more processors, whether the inferred access point satisfies a criterion;
when the inferred access point is determined to satisfy the criterion, providing the inferred access point to enable the autonomous vehicle to perform a pickup or drop-off; and
when the inferred access point is determined not to satisfy the criterion, using a feature of the set of identified features that is determined to be nearest to an estimated location of the user as the inferred access point to enable the autonomous vehicle to perform the pickup or drop-off.

2. The method of claim 1, wherein each curated feature is associated with a corresponding roadgraph feature.

3. The method of claim 2, wherein the curated features are derived from a second map data source, and the corresponding roadgraph feature is derived from the first map data source which is distinct from the second map data source.

4. The method of claim 1, wherein the curated features include one or more of:
a specific building in a multi-building complex, a residential driveway, a loading zone, a preferred pullover zone, an unmapped region driveway, a special designation parking space, a mailbox location, a seating spot, a covered parking area, or a designated walking path.

5. The method of claim 1, wherein inferring the access point is further based on at least one of an estimated walking time or a walking cost.

6. The method of claim 1, wherein the selected distance is a radius around the identified location.

7. The method of claim 1, wherein
the request identifying the location is associated with roadgraph information derived from a second map data source that is distinct from the first map data source.

8. The method of claim 1, wherein when the identified location is an indoor location, the method further includes identifying at which indoor space of the determined land parcel the user is located.

9. The method of claim 1, wherein when the inferred access point is determined not to satisfy the criterion, the method further comprises:
identifying distances to a set of roadgraph features from the estimated location of the user,
determining a nearest roadgraph feature of the set of roadgraph features, and
selecting the nearest roadgraph feature for use as the inferred access point.

10. The method of claim 1, wherein the identified location is a roadgraph feature obtained from a set of roadgraph data.

11. The method of claim 10, wherein the roadgraph feature is a driveway segment or a parking lot segment.

12. The method of claim 1, wherein when the location is associated with a pickup of a rider by the autonomous vehicle, the filtering the set of identified features to obtain only curated features that are within the selected distance from the identified location further includes discarding identified features that do not support a selected wait time for the autonomous vehicle to park.

13. The method of claim 1, wherein when the location is associated with a delivery of a package by the autonomous vehicle, the filtering the set of identified features to obtain only curated features that are within the selected distance from the identified location further includes discarding identified features that do not support a selected wait time for the autonomous vehicle to park.

14. A computing system, comprising:
memory configured to store sets of digital map information for locations of interest; and
one or more processors operatively coupled to the memory, the one or more processors being configured to:
receive a request for a user to be picked up or dropped off by an autonomous vehicle, the request identifying a location;
determine a land parcel containing the identified location based on parcel information that is derived from a first map data source;
identify a set of features within the determined land parcel that are within a selected distance from the identified location;
filter the set of identified features to obtain curated features that are: (1) within the selected distance from the identified location, and (2) within the determined land parcel;
determine a distance between each curated feature and the identified location;
infer an access point for the identified location based on the distances determined between each curated feature and the identified location;
determine whether the inferred access point satisfies a criterion;
when the inferred access point is determined to satisfy the criterion, provide the inferred access point in order to enable the autonomous vehicle to perform a pickup or drop-off; and
when the inferred access point is determined not to satisfy the criterion, use a feature of the set of identified features that is determined to be nearest to an estimated location of the user as the inferred access point to enable the autonomous vehicle to perform the pickup or drop-off.

15. The computing system of claim 14, wherein each curated feature is associated with a corresponding roadgraph feature.

16. The computing system of claim 15, wherein the curated features are derived from a second map data source, and the corresponding roadgraph feature is derived from the first map data source which is distinct from the second map data source.

17. The computing system of claim 14, wherein
the request identifying the location is associated with roadgraph information derived from a second map data source that is distinct from the first map data source.

18. The computing system of claim 14, wherein when the inferred access point is determined not to satisfy the criterion, the one or more processors are configured to:
identify distances to a set of roadgraph features from the estimated location of the user,
determine a nearest roadgraph feature of the set of roadgraph features, and
select the nearest roadgraph feature for use as the inferred access point.

19. The computing system of claim 14, wherein the identified location is a roadgraph feature obtained from a set of roadgraph data.

* * * * *